(12) United States Patent
Oosawa

(10) Patent No.: US 9,821,784 B2
(45) Date of Patent: Nov. 21, 2017

(54) BRAKE APPARATUS

(71) Applicant: HITACHI AUTOMOTIVE SYSTEMS, LTD., Hitachinaka-shi, Ibaraki (JP)

(72) Inventor: Toshiya Oosawa, Yokohama (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 652 days.

(21) Appl. No.: 14/371,309

(22) PCT Filed: Jan. 31, 2013

(86) PCT No.: PCT/JP2013/052184
§ 371 (c)(1),
(2) Date: Jul. 9, 2014

(87) PCT Pub. No.: WO2013/118632
PCT Pub. Date: Aug. 15, 2013

(65) Prior Publication Data
US 2015/0007559 A1    Jan. 8, 2015

(30) Foreign Application Priority Data
Feb. 9, 2012  (JP) .................................. 2012-026079

(51) Int. Cl.
*B60T 11/26*    (2006.01)
*F15B 1/26*    (2006.01)
(Continued)

(52) U.S. Cl.
CPC .............. *B60T 11/26* (2013.01); *B60T 7/042* (2013.01); *B60T 8/348* (2013.01); *B60T 8/38* (2013.01);
(Continued)

(58) Field of Classification Search
CPC ..... B60T 8/94; B60T 8/17; B60T 8/48; B60T 11/16; B60T 13/166; B60T 11/26; F15B 1/265
(Continued)

(56) References Cited

U.S. PATENT DOCUMENTS

| 4,026,319 A | * | 5/1977 | Pickering | ................ | B60T 11/26 |
| | | | | | 137/255 |
| 6,290,306 B1 | * | 9/2001 | Friedow | .................... | B60T 8/32 |
| | | | | | 303/113.3 |

(Continued)

FOREIGN PATENT DOCUMENTS

JP    2 201 208 A    8/1988
JP    63-215454 A    9/1988
(Continued)

*Primary Examiner* — Edelmira Bosques
*Assistant Examiner* — Richard Drake
(74) *Attorney, Agent, or Firm* — Foley & Lardner LLP

(57) ABSTRACT

In a system including a reservoir tank RSV integral with a master cylinder M/C, an inlet fluid passage 16 for connecting an inlet portion 22 of a pump P to the reservoir tank RSV, a pressure reducing fluid passage 32 that connects the inlet fluid passage 16 to wheel cylinders W/C and a normally closed pressure reducing vale 30 that is connected to the pressure reducing fluid passage 32 and opened when it is intended to depressurize a brake fluid to in the wheel cylinders thereby to return the brake fluid to the reservoir tank through the inlet fluid passage 16, there is employed a normally closed reservoir shutting valve 31 that is connected to the pressure reducing valve 30 in series with respect to the wheel cylinders W/C and the reservoir tank RSV.

17 Claims, 12 Drawing Sheets

(51) Int. Cl.
- *B60T 7/04* (2006.01)
- *B60T 13/16* (2006.01)
- *B60T 13/68* (2006.01)
- *B60T 8/34* (2006.01)
- *B60T 8/38* (2006.01)
- *B60T 8/48* (2006.01)
- *B60T 13/66* (2006.01)
- *B60T 8/88* (2006.01)

(52) U.S. Cl.
CPC ............ *B60T 8/4827* (2013.01); *B60T 8/885* (2013.01); *B60T 13/166* (2013.01); *B60T 13/662* (2013.01); *B60T 13/686* (2013.01); *F15B 1/265* (2013.01); *B60T 2270/402* (2013.01)

(58) Field of Classification Search
USPC .......................................................... 60/585
See application file for complete search history.

(56) References Cited

U.S. PATENT DOCUMENTS

| | | | |
|---|---|---|---|
| 9,050,949 B2* | 6/2015 | Miyazaki | B60T 7/042 |
| 9,242,626 B2* | 1/2016 | Maruo | B60T 8/17 |
| 2004/0212245 A1 | 10/2004 | Tsunehara et al. | |
| 2008/0234909 A1* | 9/2008 | Iwasaki | B60T 1/10 701/70 |
| 2009/0072615 A1* | 3/2009 | Oosawa | B60T 8/3275 303/113.1 |
| 2009/0226298 A1* | 9/2009 | Kajiyama | B60T 8/4031 415/65 |
| 2010/0244553 A1* | 9/2010 | Oosawa | B60T 8/341 303/116.2 |

FOREIGN PATENT DOCUMENTS

| | | |
|---|---|---|
| JP | 10-244916 A | 9/1998 |
| JP | 2001-063553 A | 3/2001 |
| JP | 2004-345629 A | 12/2004 |
| JP | 2007-216767 A | 8/2007 |
| JP | 2008-265450 A | 11/2008 |

* cited by examiner

FIG.5

| No. | 1 | 2 | 3 | 4 | 5 |
|---|---|---|---|---|---|
| WHEEL CYLINDER PRESSURE | CONTROLLING (SAME PRESSURE FOR ALL WHEEL CYLINDERS IN EACH PIPING SYSTEM) | CONTROLLING (DIFFERENT PRESSURE FOR ALL WHEEL CYLINDERS IN EACH PIPING SYSTEM) | | | 0 (UNCONTROLLED) |
| | | PRESSURE INCREASING | PRESSURE KEEPING | PRESSURE REDUCING | |
| HYDRAULIC PRESSURE CONTROL VALVE | CONTROLLING OF WHEEL CYLINDER PRESSURE | WHEEL CYLINDER PRESSURE IS CONTROLLED BASED ON A HIGHER ONE OF TARGET WHEEL CYLINDER PRESSURES IN EACH PIPING SYSTEM | | | CLOSED |
| GATE OUT VALVE | CLOSED | ← | ← | ← | OPENED |
| RESERVOIR SHUTTING VALVE | OPENED | ← | ← | ← | CLOSED |
| PRESSURE INCREASING VALVE | OPENED | OPENED | CLOSED | CLOSED | OPENED |
| PRESSURE REDUCING VALVE | CLOSED | CLOSED | CLOSED | OPENED | CLOSED |
| MOTOR | ON (ONLY IN CASE OF PRESSURE INCREASING) | ← | ← | ← | OFF |

FIG.6

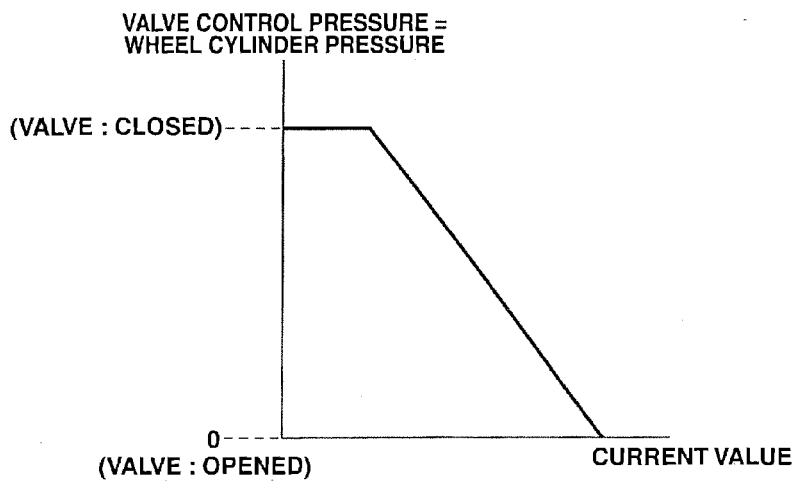

FIG.7

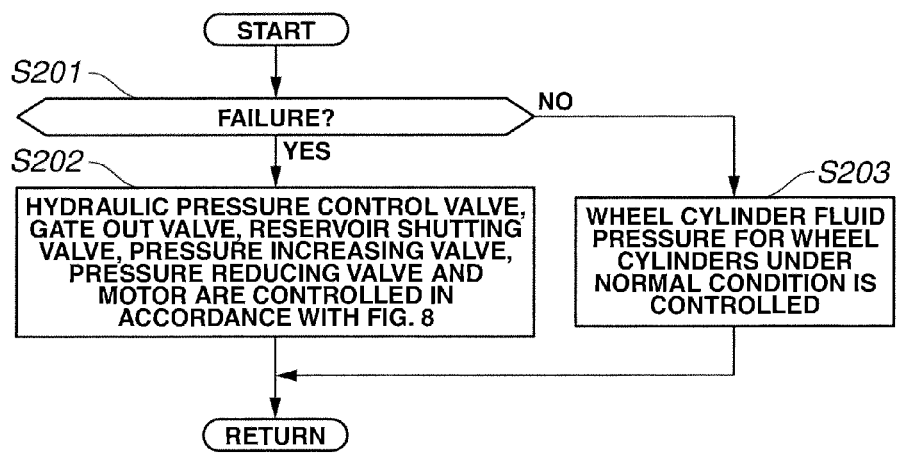

FIG.8

| No. | 1 | 2 | 3 |
|---|---|---|---|
| IN FAILURE | ONE OF PIPING SYSTEMS IS IN FAILURE | | BOTH OF PIPING SYSTEMS ARE IN FAILURE |
| | NORMAL PIPING SYSTEM | FAILED PIPING SYSTEM | |
| HYDRAULIC PRESSURE CONTROL VALVE | WHEEL CYLINDER PRESSURE IS CONTROLLED | CLOSED | ← |
| GATE OUT VALVE | CLOSED | OPENED | ← |
| RESERVOIR SHUTTING VALVE | OPENED | CLOSED | ← |
| PRESSURE INCREASING VALVE | OPENED | OPENED | ← |
| PRESSURE REDUCING VALVE | CLOSED | CLOSED | ← |
| MOTOR | ON (ONLY IN CASE OF PRESSURE INCREASING) | ← | OFF |

BRAKE APPARATUS

TECHNICAL FIELD

The present invention relates to a brake apparatus.

BACKGROUND ART

In hitherto-used brake apparatuses, a brake boosting function for boosting a brake operating force of a driver is realized by feeding a brake fluid, which is pressurized by a pump after being drawn from a reservoir, to wheel cylinders. One example of technologies related to the above-mentioned function is disclosed in Patent Document-1.

PRIOR ART DOCUMENT

Patent Document

Patent Document-1: Japanese Laid-open Patent Application (Tokkai) 2007-216767

SUMMARY OF INVENTION

Problems to be Solved by Invention

In the above-mentioned hitherto-used brake apparatus, there is a need of enhancing a reliability against a failure of the apparatus.

It is therefore an object of the present invention to provide a brake apparatus that can exhibit a high reliability against a failure of the apparatus.

Means for Solving Problems

In a brake apparatus of the present invention, there are provided between a reservoir tank and each wheel cylinder a normally closed pressure reducing valve and a normally closed shutoff valve which are connected in series.

Effects of Invention

Accordingly, the brake apparatus of the invention can exhibit a high reliability against a failure of the apparatus.

BRIEF DESCRIPTION OF DRAWINGS

FIG. 5 is a table depicting a wheel cylinder fluid pressure controlling logic of the first embodiment in the normal condition.

FIG. 6 is a control characteristic map plotting a valve opening degree of a hydraulic pressure control valve 34 of the first embodiment relative to a current value.

FIG. 7 is a flowchart depicting an operation flow of a fluid pressure control selection process that is carried out by the control unit CU of the first embodiment.

FIG. 8 is a table depicting a wheel cylinder fluid pressure controlling logic of the first embodiment in a failure condition.

EMBODIMENTS OF THE INVENTION

In the following, embodiments of a brake apparatus of the present invention will be described with reference to the drawings.

The embodiments that will be described in the following have been investigated to be applicable to various needs, and to enhance a reliability against a failure of the apparatus is one of the needs that have been discussed. The embodiments described in the following meet the needs of increasing controllability, lowering cost and increasing piping reliability.

[First Embodiment]

First, description will be directed to a construction.

Figure 1:
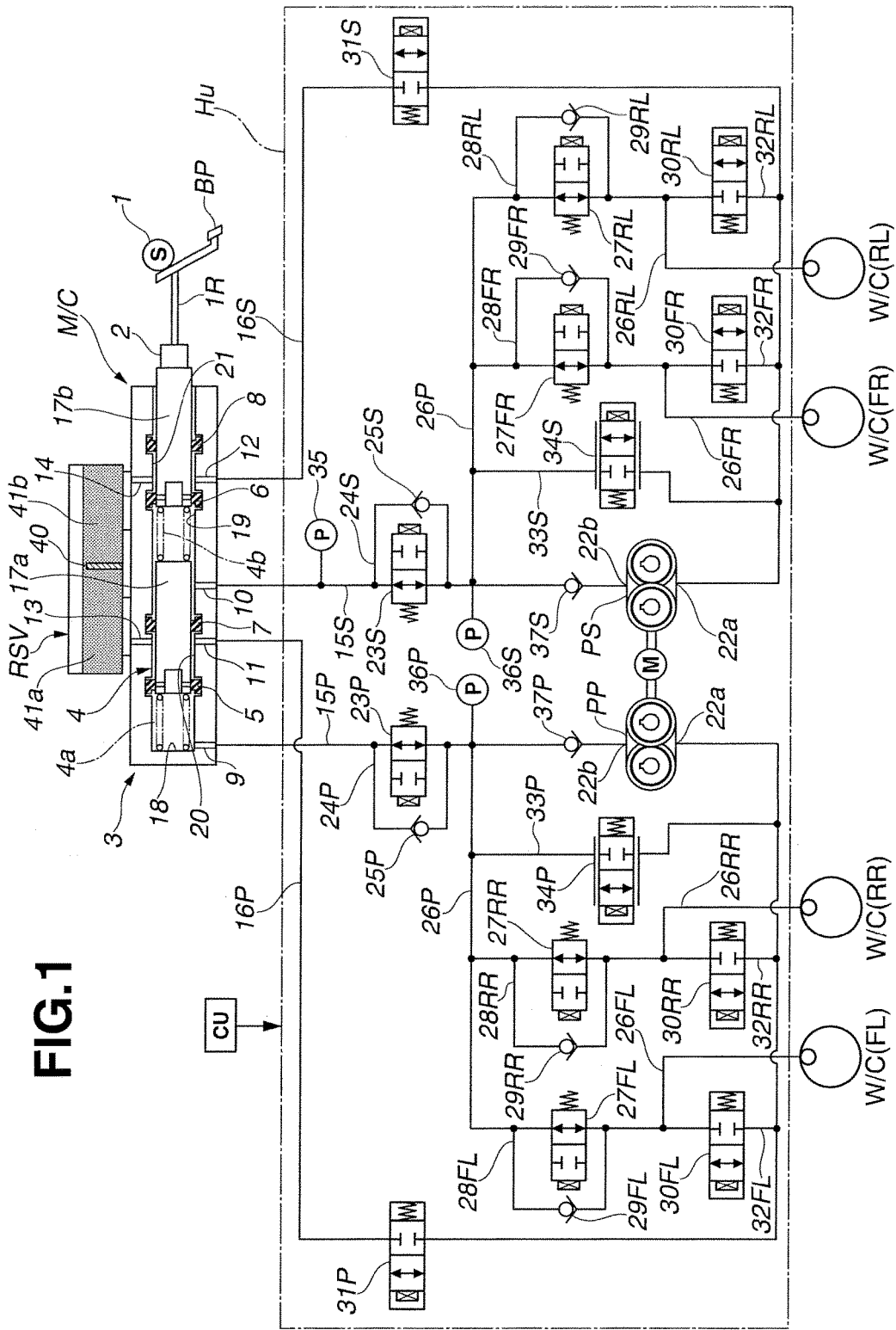
FIG. 1 is a block diagram of a brake apparatus of a first embodiment.

FIG. 1 shows a brake apparatus of a first embodiment, the brake apparatus comprising a fluid pressure control unit HU and a control unit (controller) CU.

The fluid pressure control unit HU comprises various fluid passages that are formed in a housing of aluminum and various valves and a motor M that are connected to the housing. The fluid pressure control unit HU has a piping construction called X-piping which comprises two systems, one being P-system (first brake piping system) and the other being S-system (second brake piping system). It is to be noted that characters P and S affixed to ends of references of various portions shown in FIG. 1 indicate P-system and S-system respectively, and references FL, RR, FR and RL indicate positions of a front-left wheel, a rear-right wheel, a front-right wheel and a rear-left wheel respectively. In the following description, when no distinction is made between P-system and S-system and among the wheels, attaching the characters P, S, or FL, RR, FR and RL will be omitted.

The fluid pressure control unit HU of the first embodiment uses an open type hydraulic circuit. The open type hydraulic circuit is a hydraulic circuit in which a brake fluid fed to wheel cylinders W/C can be directly returned to a reservoir tank RSV without passing through the master cylinder M/C. In contrast to the open type hydraulic circuit, there is a circuit called a close type hydraulic circuit in which the brake fluid fed to the wheel cylinders W/C is returned to the reservoir tank RSV through the master cylinder M/C.

A brake pedal (viz., brake actuating member) BP is connected to the master cylinder M/C through an input rod IR. The brake apparatus of the first embodiment is of a system that is not provided with a brake boosting device that boosts a brake operating force of a driver. Accordingly, in the fluid pressure control carried out upon a normal braking, upon detecting a manipulated variable (pedal stroke) of a brake pedal BP by a stroke sensor (brake operation condition detecting section) 1, the brake fluid stored in the reservoir tank RSV is sucked up and pressurized by a pump P to boost the wheel cylinders W/C thereby to realize a desired boost ratio. Between the input rod IR and a piston 4 of the master cylinder M/C, there is arranged a stroke simulator 2 for absorbing the pedal stroke of the brake peal BP by a predetermined amount.

Figure 2:
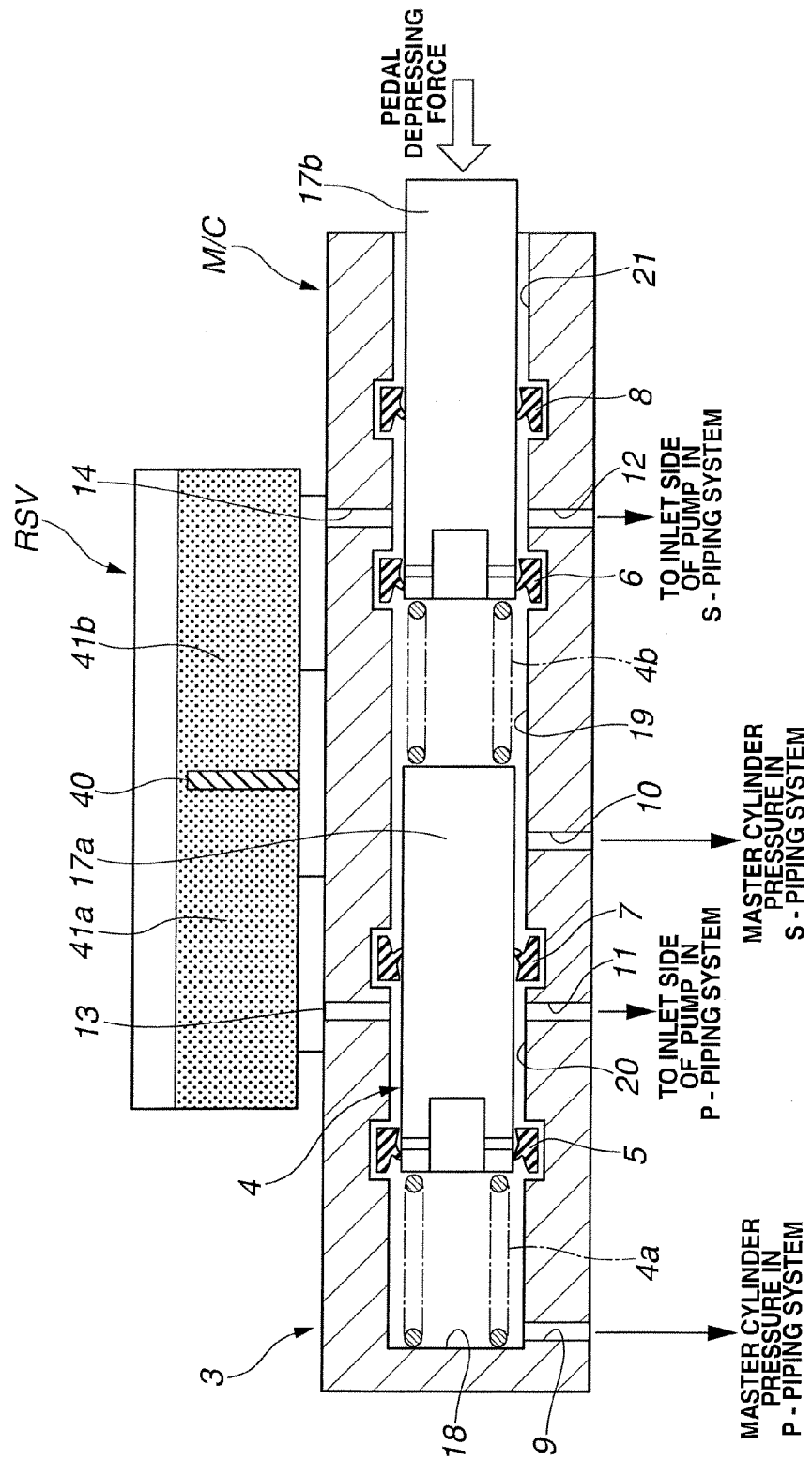
FIG. 2 is a diagram of a master cylinder M/C and a reservoir tank RSV which are employed in the first embodiment.

FIG. 2 is a diagram of the master cylinder M/C and the reservoir tank RSV which are employed in the first embodiment.

The master cylinder M/C is equipped with a cylinder body 3, a piston 4, a first piston seal 5, a second piston seal 6, a third piston seal 7 and a fourth piston seal 8.

The cylinder body 3 is constructed of an aluminum material and formed with first to sixth ports 6, 10, 11, 12, 13 and 14.

The first port (viz., first outlet port) 9 is connected to a first fluid passage 15P of the P-system and the second port (viz., second outlet port) 10 is connected to a first fluid passage 15S of the S-system. The third port 11 is connected to an inlet fluid passage 16P of the P-system and the fourth port 12 is connected to an inlet fluid passage 16S of the S-system. The fifth port 13 is connected to one 41a of chambers of the reservoir tank RSV and the fifth port 14 is connected to the other 41b of the chambers of the reservoir tank RSV. The reservoir tank RSV is integral with the master cylinder M/C and has a partition plate 40 by which the two chambers 41a and 41b are separated from one another.

The piston 4 is slidably received in a cylindrical inner wall of the cylinder body 3 and connected with the brake pedal BP. The piston 4 comprises a primary piston 17a and a secondary piston 17b. Between the primary piston 17a and an inner cylindrical end of the cylinder body 3 and between the primary piston 17a and the secondary piston 17b, there are disposed coil springs 4a and 4b respectively.

The first piston seal 5 seals between the inner cylindrical surface of the cylinder body 3 and an outer cylindrical surface of the primary piston 17a thereby to define a primary hydraulic chamber (viz., first fluid chamber) 18. The primary hydraulic chamber 18 is connected to the first port 9.

The second piston seal 6 seals between the inner cylindrical surface of the cylinder body 3 and an outer cylindrical surface of the secondary piston 17b thereby to define a secondary hydraulic chamber (viz., second fluid chamber) 19. The secondary hydraulic chamber 19 is connected to the second port 19.

The third piston seal 7 seals between the inner cylindrical surface of the cylinder body 3 and the outer cylindrical surface of the primary piston 17a thereby to define a first auxiliary fluid chamber 20. The first auxiliary fluid chamber 20 is connected to the third and fifth ports 11 and 13.

The fourth piston seal 8 seals between the inner cylindrical surface of the cylinder body 3 and the outer cylindrical surface of the secondary piston 17b thereby to define a second auxiliary fluid chamber 21. The second auxiliary fluid chamber 21 is connected to the fourth and sixth ports 12 and 14.

Referring back to FIG. 1, to the P-system, there are connected the wheel cylinder W/C(FL) of the front-left wheel and the wheel cylinder W/C(RR) of the right-rear wheel, and to the S-system, there are connected the wheel cylinder W/C(FR) of the right-front wheel and the wheel cylinder W/C(RL) of the left-rear wheel. To the P-system and S-system, there are connected pumps PP and PS. The pumps PP and PS are for example plunger pumps or gear pumps, each being driven by a single motor M and functioning to pressurize a brake fluid led from an inlet portion 22a and discharge the pressurized brake fluid to an outlet portion 22b.

The first fluid passage 15 connects the outlet portion 22b of the pump P to the first port 9 or the second port 10. The first fluid passage 15 is equipped with a normally open type electromagnetic gate out valve 23 that opens when deenergized and closes when energized. The first fluid passage 15 has a fluid passage 24 that bypasses the gate out valve 23, and the fluid passage 24 is equipped with a check valve 25. The check valve 25 allows a flowing of the brake fluid in a direction from the master cylinder M/C toward the outlet portion 22b of the pump P and stops a flowing of the brake fluid in a reversed direction.

The first fluid passage 15 at a portion between the outlet portion 22b of the pump P and the gate out valve 23 is connected to the wheel cylinder W/C through a second fluid passage 26.

The second fluid passage 26 has branched passages for all of the wheel cylinders W/C, and each of the branched passages is equipped with a normally open type electromagnetic pressure increasing valve 27. Each branched passage has a fluid passage 28 that bypasses the pressure increasing valve 27, and the fluid passage 28 is equipped with a check valve 29. The check valve 29 allows a flowing of the brake fluid in a direction from the wheel cylinder W/C toward the outlet portion 22b of the pump P and stops a flowing of the brake fluid in a reversed direction.

The inlet fluid passage 16 connects the third port 11 or the fourth port 12 to the inlet portion 22a of the pump P. The inlet fluid passage 16 is equipped with a normally closed type electromagnetic reservoir shutting valve 31 that closes when deenergized and opens when energized.

A position (or portion) of the inlet fluid passage 16 that is nearer to the inlet portion 22a of the pump P than the reservoir shutting valve 31 and a position (or portion) of the second fluid passage 26 that is nearer to the wheel cylinder W/C than the pressure increasing valve 27 are connected through a pressure reduction fluid passage 32. The pressure reducing fluid passage 32 is equipped with a pressure reducing valve 30 that is a normally closed electromagnetic valve. That is, the reservoir shutting valve 31 and the pressure reducing valve 30 are connected to the reservoir tank RSV and the wheel cylinder W/C in series.

A portion of the second fluid passage 26 that extends from the pressure increasing valve 27 to a position where the passage 26 is connected to the first fluid passage 15 and a position (or portion) of the inlet fluid passage 16 that is nearer to the inlet portion 22a of the pump P than the reservoir shutting valve 31 are connected through a third fluid passage 33. The third fluid passage 33 is equipped with a hydraulic pressure control valve 34 that is a normally closed type proportional control valve.

The first fluid passage 15 of the S-system is equipped with a first fluid pressure sensor 35 that detects a master cylinder pressure. At a junction portion between the first fluid passage 15 and the second fluid passage 26 of each system, there is provided a second fluid pressure sensor 36 that detects a discharge pressure of the pump P.

A portion of the first fluid passage 15 that extends from the outlet portion 22*b* of the pump P to a position where the passage 15 is connected to the second fluid passage 26 is equipped with a check valve 37. The check valve 37 allows a flowing of the brake fluid in a direction from the outlet portion 22*b* of the pump P toward the second fluid passage 26 and stops a flowing of the brake fluid in a reversed direction.

Based on a stroke detected by the stroke sensor 1 and hydraulic pressures detected by the first and second fluid pressure sensors 35 and 36, the control unit CU operates the gate out valve 23, the pressure increasing valve 27, the pressure reducing valve 30, the reservoir shutting valve 31 and the hydraulic pressure control valve 34 for controlling the hydraulic pressure in each wheel cylinder W/C.

[Wheel Cylinder Fluid Pressure Control in Normal Condition]

Figure 3:
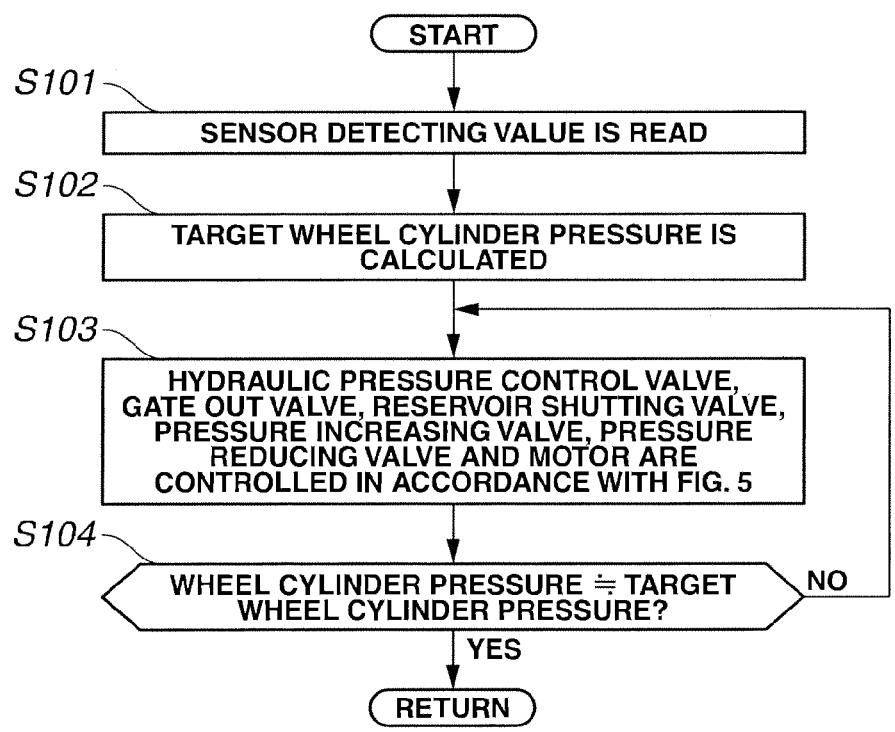
FIG. 3 is a flowchart depicting an operation flow of a wheel cylinder fluid pressure controlling process that is carried out by a control unit CU of the first embodiment in a normal condition.

FIG. 3 is a flowchart depicting an operation flow of a wheel cylinder fluid pressure controlling process that is carried out by the control unit CU of the first embodiment in a normal condition. In the following, operation steps will be described.

At step S101, sensor values detected by the sensors are read.

Figure 4:
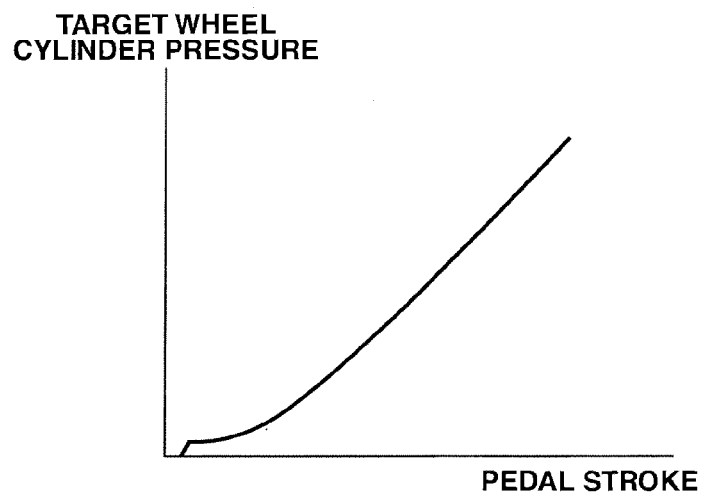
FIG. 4 is a setting map for looking up a target wheel cylinder pressure relative to a pedal stroke in the first embodiment.

At step S102, based on a pedal stroke read at step S101, a target wheel cylinder pressure is calculated with reference to the map shown in FIG. 4. FIG. 4 is a setting map that plots a target wheel cylinder pressure relative to the pedal stroke in case of the first embodiment, in which the target wheel cylinder pressure is so set as to show a larger value as the pedal stroke increases.

At step S103, the hydraulic pressure control valve 34, the gate out valve 23, the reservoir shutting valve 31, the pressure increasing valve 27, the pressure reducing valve 30 and the motor M are controlled based on the target wheel cylinder pressure calculated at step S102 with reference to the logic shown in FIG. 5. The control logic for each valve and the motor M will be described hereinafter.

At step S104, judgment is carried out as to whether the wheel cylinder pressure is substantially equal to the target wheel cylinder or not. If YES, the operation flow goes to RETURN and if NO, the operation flow goes to step S103.

FIG. 5 is table showing a control logic for the wheel cylinder fluid pressure in the first embodiment in a normal condition. In the following, control method for each valve and the motor M will be described for every scenes.

In case where due to a normal braking (with a brake boosting function), the target wheel cylinder pressures for the road wheels in the same system show the same level, the control starts from a non-controlled condition as shown in FIG. 1 (viz., hydraulic pressure control valve 34: closed, gate out valve 23: open, reservoir shutting valve 31: closed, pressure increasing valve 27: open, pressure reducing valve 30: closed, motor: OFF) and then takes a controlled condition wherein an open degree of the hydraulic pressure control valve 34 is so controlled (viz., wheel cylinder pressure control) as to cause the pressure (viz., wheel cylinder pressure) detected by the second fluid pressure sensor 36 to indicate a target wheel cylinder pressure thereby closing the gate out valve 23, opening the reservoir shutting valve 31 and naking the motor M ON (only in case of pressure increasing). FIG. 6 is a control characteristic map plotting a valve opening degree of the hydraulic pressure control valve 34 of the first embodiment relative to a current value. The hydraulic pressure control valve 34 functions to move in a closing direction when the current value is equal to or higher than a first predetermined value, and the opening degree of the valve becomes small as the current value increases, and when the current value becomes equal to or higher than a second predetermined value, the valve takes its full open position.

In case where the target wheel cylinder pressures in the same system are different from each other, the control starts from the condition shown in FIG. 1 and then takes a controlled condition wherein the hydraulic pressure control valve 34 is so controlled as to cause the pressure (viz., wheel cylinder pressure) detected by the second fluid pressure sensor 36 to indicate a higher one of the target wheel cylinder pressures thereby closing the gate out valve 23, opening the reservoir shutting valve 31 and making the motor M ON.

In case of holding or keeping the wheel cylinder pressure, the pressure increasing valve 27 is closed, and incase of reducing the pressure, the pressure increasing valve 27 is closed and the pressure reducing valve 30 is opened.

[Wheel Cylinder Fluid Pressure Control in Failure]

FIG. 7 is a flowchart depicting an operation flow of a fluid pressure controlling selection process that is carried out by the control unit CU of the first embodiment. In the following, operation steps will be described.

At step S201, judgment is carried out as to whether a failure occurs or not. If YES, the operation flow goes to step S202, and if NO, the operation flow goes to step S203.

At S202, the hydraulic pressure control valve 34, the gate out valve 23, the reservoir shutting valve 31, the pressure increasing valve 27, the pressure reducing valve 30 and the motor M are controlled based on the target wheel cylinder pressure calculated at step S102 with reference to the logic shown in FIG. 8. The control logic for each valve and the motor M will be described hereinafter.

At step S203, the wheel cylinder fluid pressure control at the time of normal condition as shown in FIG. 3 is carried out.

FIG. 8 is a table showing a control logic for the wheel cylinder fluid pressure in the first embodiment in a failure condition. In the following, control method for each valve and the motor M will be described for every scenes.

When one of the systems fails to operate, the other system, that is, the normal side system carries out the wheel cylinder hydraulic pressure control for the normal condition, and the system in failure is controlled to close the reservoir shutting valve 31.

When both systems fail to operate, all the valves of both systems and the motor M are made inoperative.

In the following, operation will be described.

(In Normal Condition)

Figure 9:
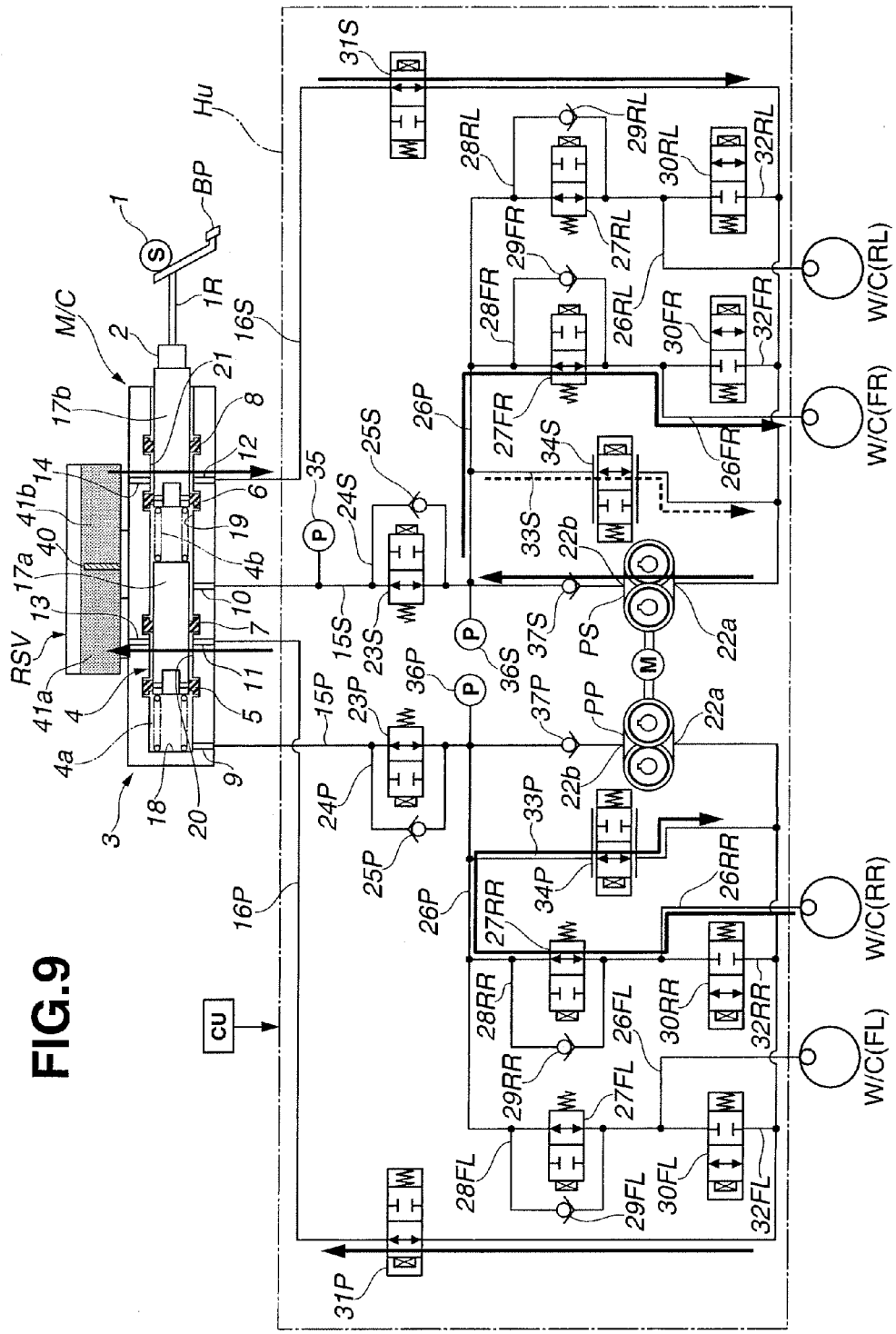
FIG. 9 is a hydraulic circuit diagram of the first embodiment showing a flow of a brake fluid in a normal condition.
Figure 10:
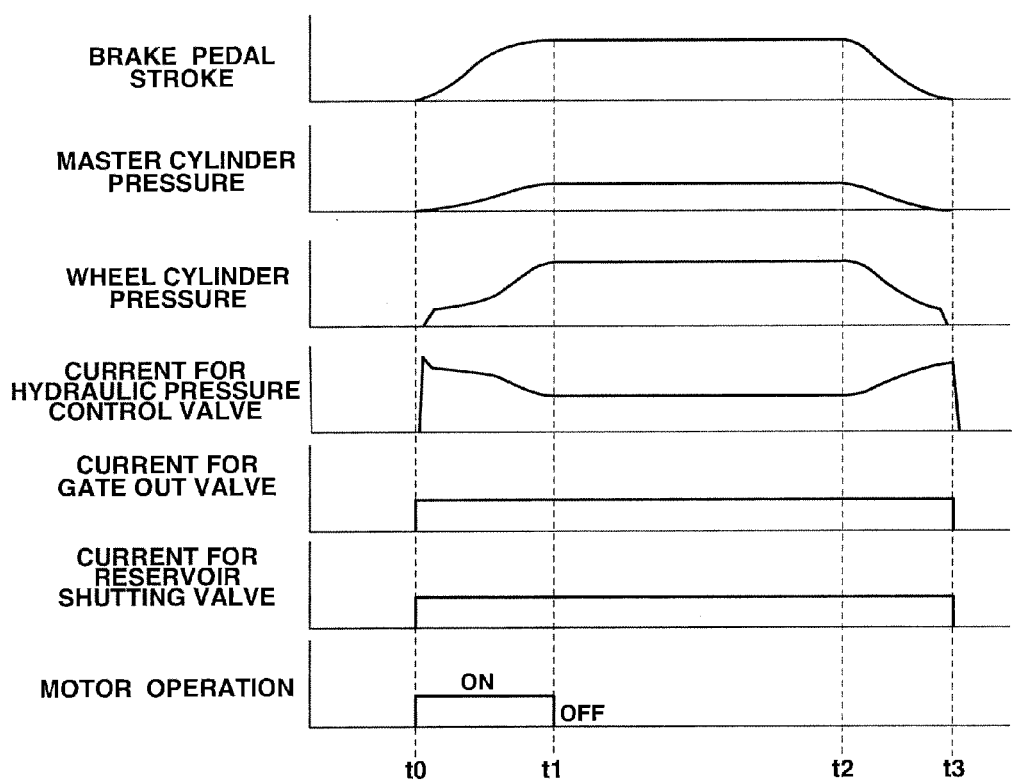
FIG. 10 is a time chart depicting operation of various valves and a motor M of the first embodiment in a normal condition.

FIG. 9 is a hydraulic circuit diagram of the first embodiment showing a flow of the brake fluid in the normal condition, and FIG. 10 is a time chart depicting operation of various valves and the motor M of the first embodiment in the normal condition. In FIG. 9, a flow of the brake fluid at the time of increasing the pressure is indicated by arrows in S-system and a flow of the brake fluid at the time of reducing the pressure is indicated by arrows in P-system.

For increasing the pressure, the gate out valve 23 is closed thereby to shut off the fluid communication between the master cylinder M/C and each of the wheel cylinders W/C. Thereafter, the reservoir shutting valve 31 is opened and the motor M is energized. With this, the brake fluid sucked from the reservoir tank RSV is pressurized by the pump P and discharged to the second fluid passage 26. The hydraulic pressure control valve 34 is controlled to vary its open degree in such a manner that the pressure detected by the second fluid pressure sensor 36 coincides with the target wheel cylinder pressure. With this, boosting to the pedal depression force by the pump-used pressure increasing is realized (see t0 to t1 of FIG. 10).

For reducing the pressure, the gate out valve 23 is closed thereby to shut off the fluid communication between the master cylinder M/C and each of the wheel cylinders W/C. Thereafter, the reservoir shutting valve 31 is opened and the hydraulic pressure control valve 34 is controlled to vary its open degree in such a manner that the pressure detected by the second fluid pressure sensor 36 coincides with the target wheel cylinder pressure. With this, unnecessary brake fluid can be returned from the inlet fluid passage 16 to the reservoir tank RSV (see t2 to t3 of FIG. 10).

(In Failed Condition)

Figure 11:
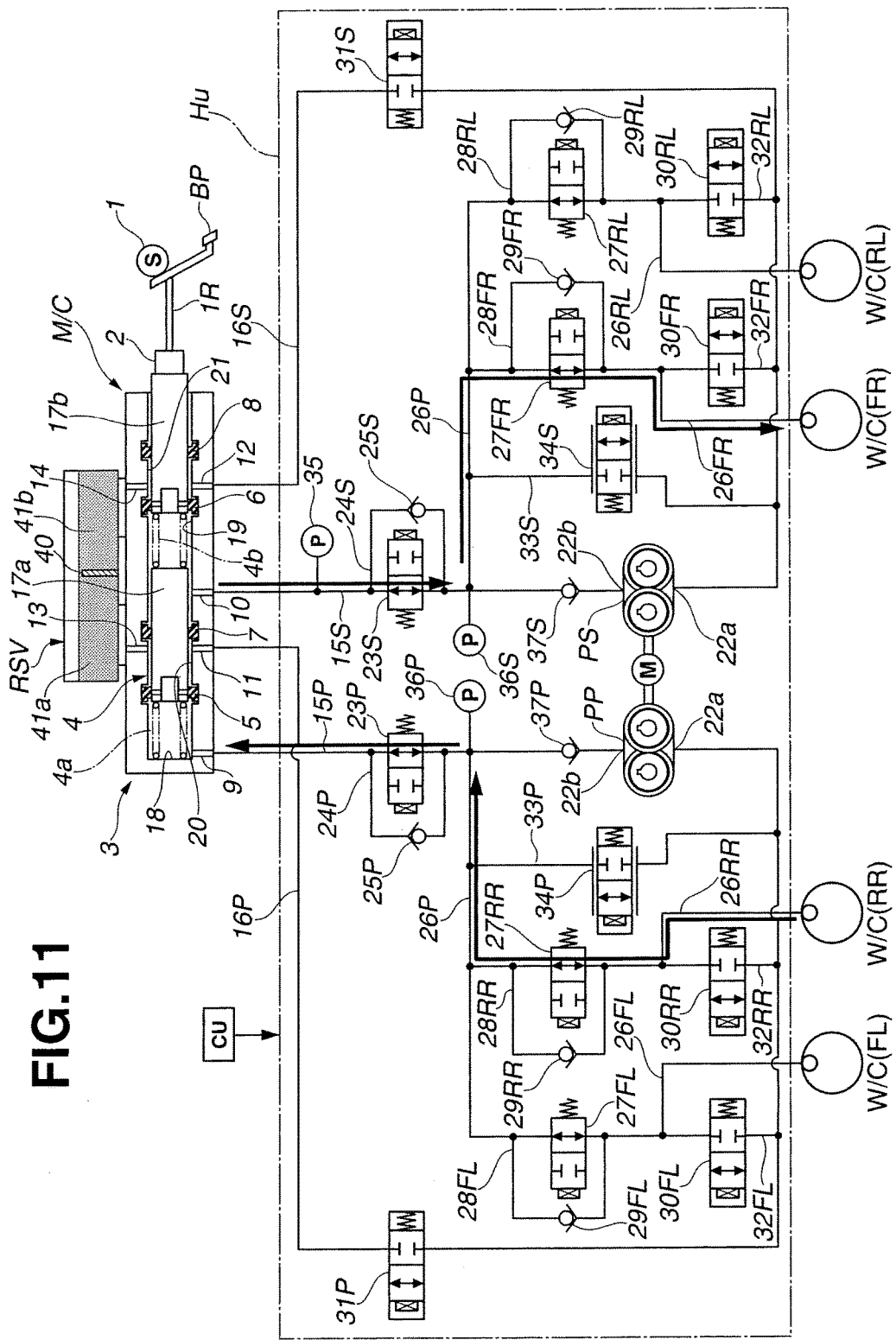
FIG. 11 is a hydraulic circuit diagram of the first embodiment showing a flow of the brake fluid in a failure condition.
Figure 12:
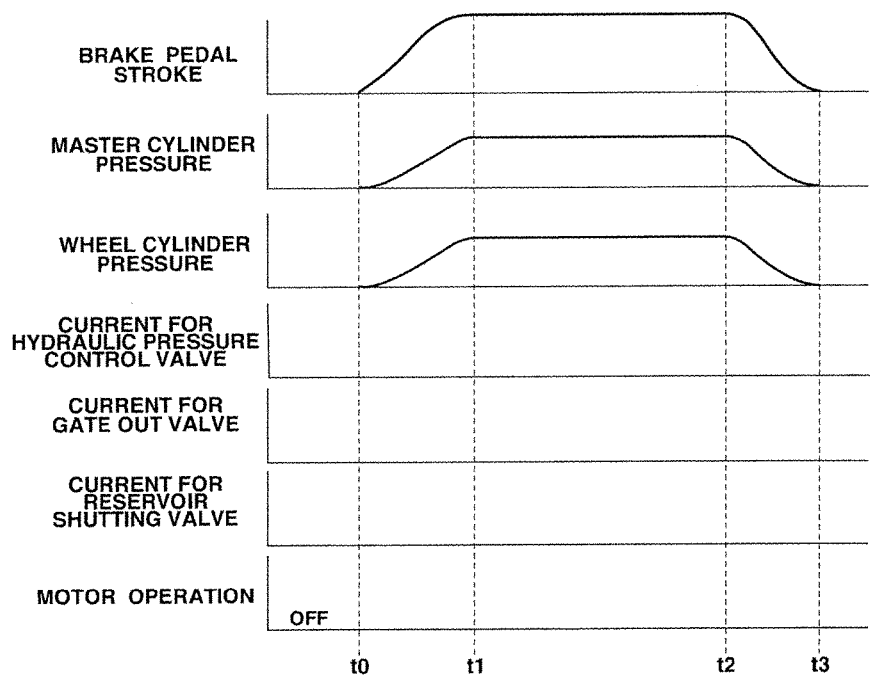
FIG. 12 is a time chart depicting operation of the various valves and the motor M of the first embodiment at a time when both systems are in failure.
Figure 13:
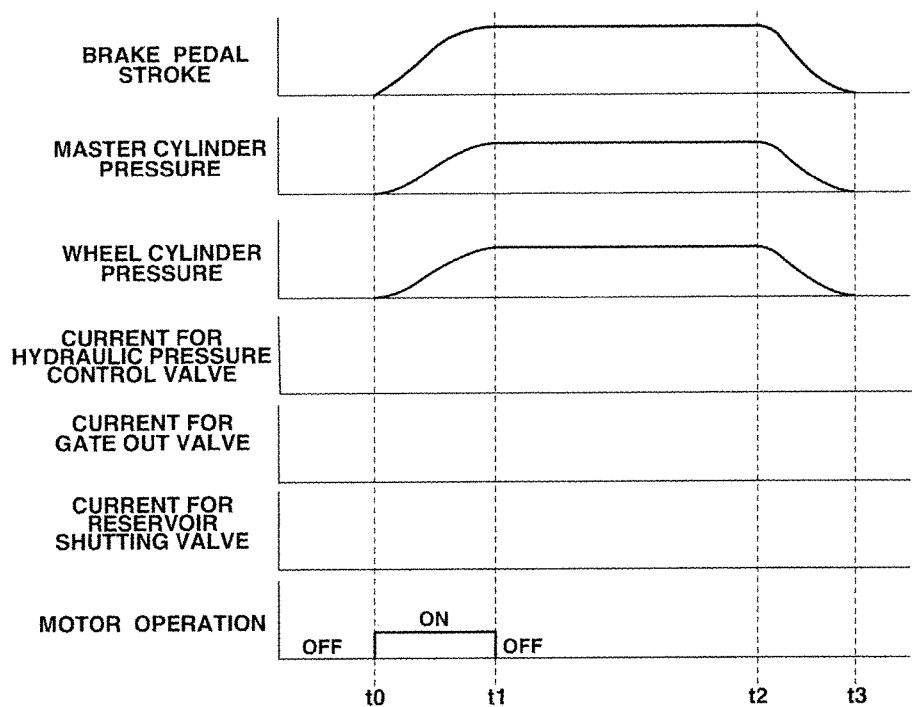
FIG. 13 is a time chart depicting operation of the various valves and the motor M of the first embodiment at a time when one of the systems is in failure.

FIG. 11 is a hydraulic circuit diagram of the first embodiment showing a flow of the brake fluid in a failed condition, FIG. 12 is a time chart depicting operation of various valves and the motor M of the first embodiment in a failed condition of both systems and FIG. 13 is a time chart depicting operation of the various valves of a failed one of the systems and the motor M of the first embodiment in a condition wherein one of the systems is in failure. In FIG. 11, a flow of brake fluid at the time of increasing the pressure is indicated by arrows in S-system which is in failure and a flow of the brake fluid at the time of reducing the pressure is indicated by arrows in P-system which is in failure.

For increasing the pressure, the gate out valve 23 is opened and the reservoir shutting valve 31 is closed. With this, a brake fluid pressure generated in the master cylinder M/C in accordance with the pedal depression force of the driver can be delivered to the wheel cylinders W/C through the first fluid passage 15 and the second fluid passage 26, so that a braking force in accordance with the pedal depressing force can be produced (see t0 to t1 of FIG. 12). In case of reducing the pressure, unnecessary brake fluid left in the wheel cylinders W/C due to reduction in the pedal depressing force of the driver can be returned to the master cylinder M/C through the second fluid passage 26 and the first fluid passage 15 (see t2 to t3 of FIG. 12).

In case where one of the systems fails to operate, by energizing the motor M (see t0 to t1 of FIG. 13), the normally operated system is able to feed a pressurized brake fluid to the wheel cylinders W/C like in the case depicted by FIG. 10, and the failed one of the systems is able to generate a braking force in accordance with the pedal depressing force like in the case depicted by FIG. 12.

[Increased Reliability in Case of Failure]

In the hitherto-used brake apparatus described in Patent Document-1, a normally closed valve is provided between the wheel cylinders and the reservoir, so that upon failure in electric power source, undesired phenomenon in which the brake fluid would be slovenly shifted from the wheel cylinders to the reservoir suppressing the wheel cylinders from receiving the brake fluid is avoided. That is, a so-called useless depression of the brake pedal is prevented. However, since, in the above-mentioned hitherto-used brake apparatus, means for shutting of the fluid communication between the wheel cylinders and the reservoir is a single normally closed valve, if the normally closed valve becomes out of order and locked at its open position, the flow of the brake fluid from the master cylinder to the reservoir can not be stopped and thus reliability is low.

In the above-mentioned hitherto-used apparatus, the brake fluids from wheel cylinders of both piping systems are joined and led to the reservoir through a single fluid passage. Accordingly, if one of the piping systems is subjected to a leakage to the outside, the brake fluid in the normally operated piping system is forced to leak through the single fluid passage. Accordingly, in the above-mentioned apparatus, it has been impossible to permit the normally operated piping system to generate a braking force for an associated motor vehicle.

While, in the brake apparatus of the first embodiment, there are arranged two normally closed valves in series, which are the pressure reducing valve 30 and the reservoir shutting valve 31, between the wheel cylinder W/C and the reservoir tank RSV. That is, since two normally closed valves are arranged between the wheel cylinder W/C and the reservoir tank RSV, even if one of the normally closed valves becomes out of order and locked at its open position, closing the other normally closed valve can bring about suppression of the useless depression of the brake pedal, and it is possible to generate a wheel cylinder pressure in accordance with the brake pedal depressing force of the driver. Accordingly, as compared with the above-mentioned hitherto-used apparatus having only one normally closed valve, reliability in case of failure is increased in this embodiment.

Furthermore, since the inlet fluid passages 16 are respectively provided for both piping systems and the reservoir tank RSV is constructed to have two chambers 41a and 41b with usage of the partition plate 40, even if one of the piping systems is subjected to a leakage to the outside, a braking force can be produced by the other (viz., normally operated) piping system and thus, reliability in case of failure is much more increased.

Furthermore, the master cylinder M/C is provided with the first and second auxiliary fluid chambers 20 and 21 connected to the reservoir tank RSV, and the inlet fluid passage 16 is connected to the reservoir tank RSV and the inlet portion 22a of the pump P through the first and second auxiliary fluid chambers 20 and 21. Accordingly, there is no need of preparing an exterior piping such as a hose or the like for providing a construction serving as the inlet fluid passage 16, and thus, mountability is improved. Furthermore, since the inlet fluid passage 16 is formed in a housing made of aluminum material and the inlet fluid passage 16 is made of a steel pipe, a piping reliability is increased as compared with a construction in which an external piping such as a hose or the like made of a flexible material is clamped and fixed to a base portion by a hose clamp.

The brake apparatus of the first embodiment can be produced by adding the inlet fluid passage 16 and the reservoir shutting valve 31 to an existing system that includes the gate out valve 23, the pressure increasing valve 27, the pressure reducing valve 30 and the pump P. That is, since the brake apparatus can be produced by making a small change to an existing system, it is very advantageous in regards to cost.

The control unit CU controls the gate out valve 23 in a valve closing direction, controls the pressure increasing valve 27 in a valve opening direction, controls the pressure reducing valve 30 in a valve closing direction and carries out a pressure increasing control for driving the pump P, and thus, a pressure increasing control for the power boosting function and the like can be realized with a simple control.

To a third fluid passage 33 that connects a portion of the second fluid passage 26 between the pressure increasing valve 27 and a position where the passage 26 is connected to the first fluid passage 15 to the inlet fluid passage 16, there is connected the hydraulic pressure control valve 34. Due to the hydraulic pressure control valve 34, at the time of carrying out the pressure increasing control, unnecessary part of the brake fluid discharged from the outlet portion 22b of the pump P can be returned to the inlet portion 22a of the pump P. Since the hydraulic pressure control valve 34 is higher in responsibility than the pump P, controllability is improved. Due to the hydraulic pressure control valve 34, at the time of carrying out the pressure reducing control, unnecessary part of the brake fluid can be returned from the inlet fluid passage 16 to the reservoir tank RSV. Furthermore, since the hydraulic pressure control valve 34 is a proportional control valve, a very fine controlling of the hydraulic pressure is made and thus, the controllability can be much increased.

Due to the work of the control unit CU, the hydraulic pressure control valve 34 and reservoir shutting valve 31 are controlled to move in an opening direction for returning the brake fluid in the wheel cylinders W/C to the reservoir tank RSV. Thus, the pressure reducing control can be carried out with a simple control.

In addition to the above, due to the work of the control unit CU, the pump P and the valves are controlled to carry out a hydraulic pressure control even under a failure of one of the piping systems. Thus, the braking force can be adjusted by using the other normal one of the piping systems.

In the following, advantages or effects will be described.

The brake apparatus of the first embodiment has advantages that will be described in the following.

(1) There is provided a system that comprises a stroke sensor 1 that detects a pedal stroke (operation condition) of a brake pedal BP actuated by a driver; a pump P that produces a hydraulic pressure for a wheel cylinder W/C based on the pedal stroke detected by the stroke sensor 1; a master cylinder M/C that includes first and second ports 9 and 10 connected to the wheel cylinder W/C, a tubular cylinder body 3 including primary and secondary hydraulic chambers 18 and 19 for producing a hydraulic pressure upon brake operation by the driver, a piston 4 slidably received in a cylindrical inner surface of the cylinder body 3 and linked with the brake pedal BP and first and second piston seals 5 and 6 which respectively seal between the cylindrical inner surface of the cylinder body 3 and a cylindrical outer surface of the piston 4 to define the primary and secondary hydraulic chambers 18 and 19; a reservoir tank RSV that is integrally mounted to the master cylinder M/C; an inlet fluid passage 16 that connects the inlet portion 22a of the pump P to the reservoir tank RSV; a pressure reducing fluid passage 32 that connects the inlet fluid passage 16 to the wheel cylinder W/C; a normally closed pressure reducing valve 30 that is connected to the pressure reducing fluid passage 32 and arranged to open upon reduction in pressure of the brake fluid in the wheel cylinder W/C thereby to allow the brake fluid to return to the reservoir tank RSV through the inlet fluid passage 16; and a normally closed reservoir shutting valve 31 that is connected to the inlet fluid passage 16 and connected to the pressure reducing valve 30 in series with respect to the wheel cylinder W/C and the reservoir tank RSV.

Accordingly, a reliability in a failure can be improved.

(2) The master cylinder M/C is equipped with first and second auxiliary fluid chambers 20 and 21 connected to the reservoir tank RSV that is hermetically isolated from the primary and secondary hydraulic chambers 18 and 19, and the inlet fluid passage 16 passes through the first and second auxiliary fluid chambers 20 and 21 and connects the reservoir tank RSV and the inlet portion 22a of the pump P.

Accordingly, there is no need of preparing an external piping such as a hose or the like for constituting the inlet fluid passage 16, and thus, mountability is increased.

(3) The brake apparatus is characterized by including an gate out valve 23 connected to a first fluid passage 15 that connects an outlet portion 22b of a pump P to first and second ports 9 and 10, a second fluid passage 26 that is branched from a passage between the outlet portion 22b of the pump P of the first fluid passage 15 and the gate out valve 23 and connected to a wheel cylinder W/C and a pressure increasing valve 27 that is connected to the second fluid passage 26.

Because as is mentioned hereinabove the brake apparatus of the invention can be provided by making a miner change to a known system, it is advantageous in cost.

The brake apparatus is equipped with a control unit CU that controls the pump P and various valves, in which the control unit CU carries out a pressure increasing control to control the gate out valve 23 in a valve closing direction, the pressure increasing valve 27 in a valve opening direction and the pressure reducing valve 30 in a valve closing direction.

Accordingly, a pressure increasing control for a boosting function and the like can be realized with a simple control.

(5) There is provided a third fluid passage 33 that connects an interposition between the pressure increasing valve 27 of the second fluid passage 26 and a junction portion between the second fluid passage 26 and the first fluid passage 15 to the inlet fluid passage 16, and the third fluid passage 33 is provided with a hydraulic pressure control valve 34.

Accordingly, due to usage of the hydraulic pressure control valve 34, controllability can be increased.

[Second Embodiment]

Figure 14:
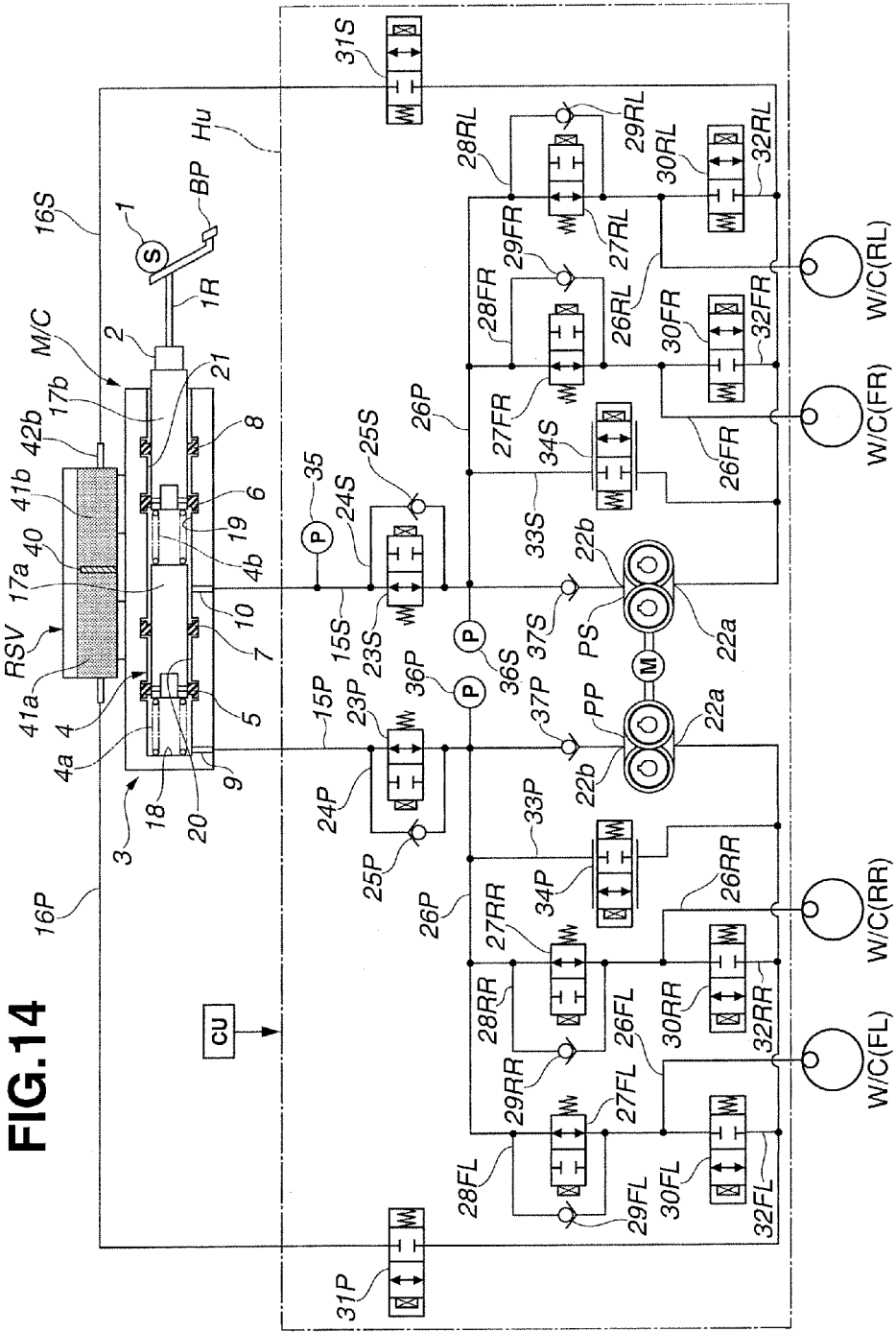
FIG. 14 is a bock diagram of a brake apparatus of a second embodiment.
Figure 15:
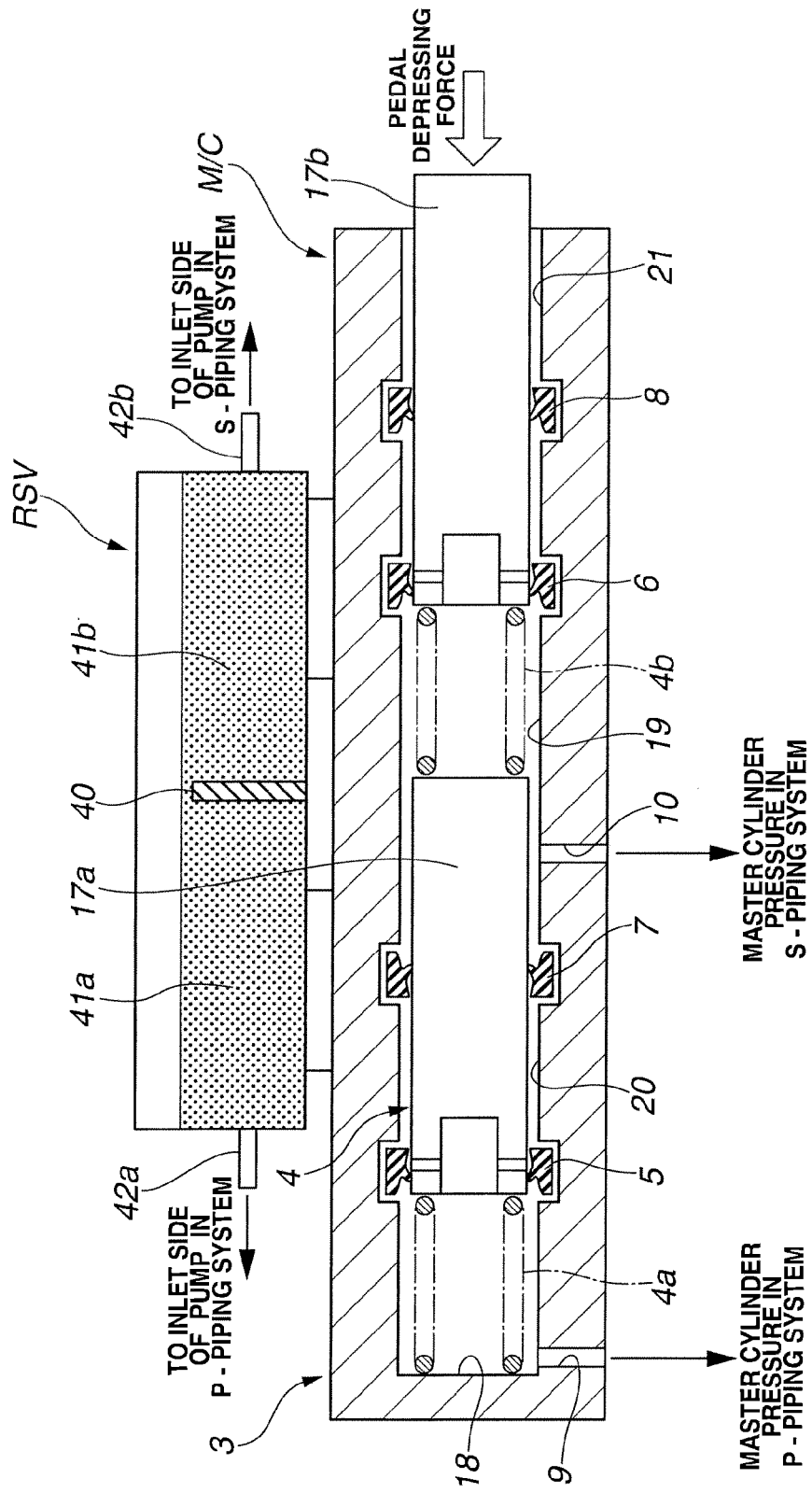
FIG. 15 is a diagram of a master cylinder M/C and a reservoir tank RSV which are employed in the second embodiment.

FIG. 14 is a block diagram of a brake apparatus of a second embodiment, and FIG. 15 is a diagram of a master cylinder M/C and a reservoir tank RSV which are employed in the second embodiment. In the second embodiment, a point in which the inlet fluid passage 16 is connected to the reservoir tank RSV is different from that in the first embodiment. In the inlet fluid passage 16, a portion from the reservoir tank RSV to the reservoir shutting valve 31 is made of a rubber hose.

At side surfaces of the reservoir tank RSV, there are provided two, namely, first and second pipe portions 42a and 42b. An inner end of the first pipe portion 42a is connected to one 41a of the chambers, and an inner end of the second pipe portion 42b is connected to the other 41b of the chambers. The inlet fluid passages 16P and 16S are clamped and fixed to outer surfaces of the first and second pipe portions 42a and 42b through hose clamps.

The master cylinder M/C of the second embodiment has such a construction as that of the first embodiment with deletion of the third to sixth ports 11, 12, 13 and 14.

Since the other construction is identical to that of the first embodiment, explanation of it will be omitted.

As is described hereinabove, since, in the brake apparatus of the second embodiment, the inlet fluid passages 16 are clamped and fixed to the reservoir tank RSV by the clamps, assembling work is simple as compared with that of the first embodiment, and thus, it is advantageous in regards to cost.

[Other Embodiments]

In the above, explanation has been made on embodiments of the present invention. However, concrete construction of the present invention is not limited to the constructions shown by the embodiments, and design changes that do not deviate from the gist of the present invention are included in the present invention.

In the above-mentioned embodiments, there is described an example in which the stroke sensor 1 is used as a brake operation condition detecting section and a target wheel cylinder pressure is set based on the pedal stroke. However, if desired, another example can be used in which a leg-power sensor for detecting a pedal depressing force is used as the brake operation condition detecting section, and the target wheel cylinder pressure is set based on the pedal depressing force.

In the following, technical ideas (or thought) grasped by the embodiments while deviating from the invention defined by Claims will be described.

(a) A brake apparatus as defined in claim 5, which is characterized in that the hydraulic pressure control valve is a proportional valve.

Accordingly, fine controlling is possible.

(b) A brake apparatus as defined in (a), which is characterized in that a controller for controlling the pump and the various valves is provided, and the controller controls the proportional valve and the shutting valve in a valve opening direction thereby to return the brake fluid from the wheel cylinder to the reservoir tank.

Accordingly, a pressure reduction control can be realized with a simple controlling.

(c) A brake apparatus as defined in claim 2, which is characterized in that the inlet fluid passage is made of a steel tube.

Accordingly, reliability of piping is much improved as compared with a case in which an external pipe such as hose or the like made of a flexible material is clamped and fixed to a given portion by a hose clamp.

(d) A brake apparatus comprising a brake piping that includes a first brake piping system and a second brake piping system isolated from the first brake piping system, each piping system having a plurality of wheel cylinders that are mounted to respective road wheels for producing a braking force;

a brake operation condition detecting section that detects an operation condition of a brake operation member actuated by a driver;

a pump provided to each of the piping systems and producing a hydraulic pressure for the wheel cylinders based on the brake operation condition detected by the brake operation condition detecting section;

a cylinder body including a first fluid chamber that has a first outlet port connected to the first brake piping system and produces a hydraulic pressure upon braking operation by the driver and a second fluid chamber that has a second outlet port connected to the second brake piping system and produces a hydraulic pressure upon braking operation of the driver, the second fluid chamber being isolated from the first fluid chamber;

a master cylinder including a plurality of pistons that are slidably received in a cylindrical inner surface of the cylinder body and connected to the brake operation member, a first piston seal that seals between the cylindrical inner surface of the cylinder body and a cylindrical outer surface of one of the pistons thereby to define the first fluid chamber and a second piston seal that seals between the cylindrical inner surface of the cylinder body and a cylindrical outer surface of the other of the pistons thereby to define the second fluid chamber;

a reservoir tank that is integral with the master cylinder;

a first inlet fluid passage that connects an inlet portion of the pump of the first brake piping system to the reservoir tank;

a second inlet fluid passage that connects an inlet portion of the pump of the second brake piping system to the reservoir tank;

first and second pressure reducing fluid passages that connect the first and second inlet fluid passages to the wheel cylinders respectively; and a normally closed pressure reducing valve provided to each of the pressure reducing fluid passages, the normally closed pressure reducing valve being opened when it is intended to depressurize the brake fluid in the wheel cylinders thereby to return the brake fluid to the reservoir tank through the corresponding inlet fluid passage, which is characterized in that each of the inlet fluid passages is provided with a normally closed shutting valve that is connected to the pressure reducing valve in series with respect to the wheel cylinder and the reservoir tank.

Accordingly, reliability in case of failure is increased.

(e) A brake apparatus as defined in (d), which is characterized in that the reservoir tank is equipped with mutually isolated two chambers, one being connected the first inlet fluid passage and the other being connected to the second inlet fluid passage.

Accordingly, even when one of the piping systems is subjected to a leakage to the outside, a braking force can be produced by the other, namely, the normally operated piping system, and thus, reliability in case of failure is much improved.

(f) A brake apparatus as defined in (e), which is characterized in that a controller is provided for controlling the pumps and the various valves, and in that the controller carries out a hydraulic pressure control by controlling the pumps and the valves even when one of the systems fails to operate.

Accordingly, even in case of failure of one of the piping systems, a braking force for the vehicle can be adjusted by using the normally operated piping system.

(g) A brake apparatus as defined in (f), which is characterized by having a gate out valve provided to a first fluid passage that connects the outlet portion of each of the pumps to each of the outlet ports;

a second fluid passage that is branched from an interposition between the outlet portion of the pump of the first fluid passage and the gate out valve and connected to the wheel cylinders; and a pressure increasing valve connected to the second fluid passage.

Since the brake apparatus can be produced by making a small change to an existing system, it is advantageous in regards to cost.

(h) A brake apparatus as defined in (d), which is characterized in that the master cylinder is equipped with an auxiliary fluid chamber that is connected to the reservoir tank fluid-tightly isolated from the first fluid chamber, and in that the inlet fluid passage connects the reservoir tank to the inlet portion of the pump through the auxiliary fluid chamber.

Accordingly, there is no need of providing an external piping, such as a hose or the like, for constituting the inlet fluid passage, and thus, mountability is increased.

(i) A brake apparatus as defined in (h), which is characterized by having a gate out valve provided to a first fluid passage that connects the outlet portion of the pump to each of the outlet ports;

a second fluid passage that is branched from an interposition between the outlet portion of the first fluid passage and the gate out valve and connected to the wheel cylinder; and a pressure increasing valve connected to the second fluid passage.

Since the brake apparatus an be produced by making a small change to an existing system, it is advantageous in regards to cost.

(j) A brake apparatus as defined in (i), which is characterized in that a controller for controlling the pump and the various valves is provided, and the controller carries out a pressure increasing control for driving the pump by controlling the gate out valve in a valve closing direction, the pressure increasing valve in a valve opening direction and the pressure reducing valve in a valve closing direction.

Accordingly, the pressure increasing control can be carried out with a simple control.

(k) A brake apparatus as defined in (j), which is characterized in that a third fluid passage is provided for connecting an interposition between the pressure increasing valve of the second fluid passage and a portion where the second fluid passage is connected to the first fluid passage to the inlet fluid passage, and in that the third fluid passage is provided with a hydraulic pressure control valve.

Thus, due to usage of the hydraulic pressure control valve, controllability can be improved.

(i) A brake apparatus as defined in (k), which is characterized in that the hydraulic pressure control valve is a proportional control valve.

Accordingly, fine controlling can be made.

(m) A brake apparatus as defined in (i), which is characterized in that a controller is provided for controlling the pump and the various valves, and in that the controller controls the proportional control valve and the shutting valve in a valve opening direction thereby to return the brake fluid from the wheel cylinders to the reservoir.

Accordingly, a pressure reduction control can be realized with a simple controlling.

(n) A brake apparatus comprising a master cylinder that is equipped with a cylinder body that includes a first fluid chamber that has an outlet port connected to a wheel cylinder and produces a hydraulic pressure upon braking operation by a driver, a piston that is slidably received in a cylindrical inner surface of the cylinder body and connected to a brake operating member and a first piston seal that seals between the cylindrical inner surface of the cylinder body and a cylindrical outer surface of the piston thereby to define the first fluid chamber;

an inlet fluid passage that connects an inlet portion of a pump and a reservoir tank;

a pressure reducing fluid passage that connects the inlet fluid passage and the wheel cylinder; and a normally closed pressure reducing valve connected to the pressure reducing fluid passage, which is characterized in that between the reservoir tank and the wheel cylinder, there are arranged the pressure reducing valve and a normally closed shutting valve.

Accordingly, reliability in case of failure is improved.

(o) A brake apparatus which is characterized in that the inlet fluid passage is constructed of a steel pipe.

Accordingly, reliability of piping is much improved as compared with a case in which an external pipe such as hose or the like made of a flexible material is clamped and fixed to a given portion by a hose clamp.

DESCRIPTION OF REFERENCE NUMERALS

1 . . . stroke sensor (brake operation condition detecting section)
3 . . . cylinder body
4 . . . piston
5 . . . first piston seal
9 . . . first port (first outlet port)
16 . . . inlet fluid passage
18 . . . primary fluid chamber (first fluid chamber)
30 . . . pressure reducing valve
31 . . . reservoir shutting valve
32 . . . pressure reducing fluid passage
. . . pump
RSV . . . reservoir tank
W/C . . . wheel cylinder

The invention claimed is:

1. A brake apparatus comprising:
a brake operation condition detecting section that detects an operation condition of a brake operation member actuated by a driver;
a pump that produces a hydraulic pressure for wheel cylinders based on the brake operation condition detected by the operation condition detecting section;
a master cylinder that includes a cylinder body that has an outlet port connected to the wheel cylinders and has a first fluid chamber to produce a hydraulic pressure upon braking operation by the driver, a piston that is slidably received in a cylindrical inner surface of the cylinder body and connected to the brake operation member, and a first piston seal that seals between the cylindrical inner surface of the cylinder body and a cylindrical outer surface of the piston to define the first fluid chamber;
a reservoir tank that is integral with the master cylinder;
an inlet fluid passage that connects an inlet portion of the pump to the reservoir tank;
a pressure reducing fluid passage that connects the inlet fluid passage to the wheel cylinders; and
a pressure reducing valve connected to the pressure reducing fluid passage and opened to depressurize brake fluid in one of the wheel cylinders thereby to return the brake fluid to the reservoir tank through the inlet fluid passage,
wherein the inlet fluid passage is provided with a normally closed shutting valve that is connected to the at least one pressure reducing valve in series with respect to the wheel cylinders and the reservoir tank, a gate out valve provided to a first fluid passage that connects an outlet portion of the pump to the outlet port; a second fluid passage that is branched from an interposition between the outlet portion of the pump of the first fluid passage and the gate out valve and connected to the wheel cylinders; and a pressure increasing valve connected to the second fluid passage.

2. A brake apparatus as claimed in claim 1,
wherein the master cylinder is equipped with an auxiliary fluid chamber that is connected to the reservoir tank fluid-tightly isolated from the first fluid chamber, and the inlet fluid passage connects the reservoir tank to the inlet portion of the pump through the auxiliary fluid chamber.

3. A brake apparatus as claimed in claim 2, further comprising a controller programmed to control the pump and various valves, and to carry out a pressure increasing control by controlling the gate out valve in a valve closing direction, the pressure increasing valve in a valve opening direction and the pressure reducing valve in a valve closing direction.

4. A brake apparatus as claimed in claim 2, wherein a third fluid passage is provided for connecting an interposition between the pressure increasing valve of the second fluid passage and a portion where the second fluid passage is connected to the first fluid passage to the inlet fluid passage, and the third fluid passage is provided with a hydraulic pressure control valve.

5. A brake apparatus as claimed in claim 4, wherein the hydraulic pressure control valve is a proportional valve.

6. A brake apparatus as claimed in claim 5, further comprising a controller programmed to control the pump and various valves, and to control the proportional control valve and the shutting valve in a valve opening direction thereby to return the brake fluid from the wheel cylinders to the reservoir tank.

7. A brake apparatus as claimed in claim 2, wherein the inlet fluid passage is constructed of a steel pipe.

8. A brake apparatus comprising:
a brake piping that includes first and second brake piping systems having a plurality of wheel cylinders mounted to respective road wheels for producing a braking force, the second brake piping system being isolated from the first brake piping system;
a brake operation condition detecting section that detects an operation condition of a brake operation member actuated by a driver;
a pump provided to each of the piping systems and producing a hydraulic pressure for the wheel cylinders based on the operation condition detected by the brake operation condition detecting section;
a cylinder body including a first fluid chamber that has a first outlet port connected to the first brake piping system and produces a hydraulic pressure upon braking operation by the driver and a second fluid chamber that has a second outlet port connected to the second brake piping system and produces a hydraulic pressure upon braking operation of the driver, the second fluid chamber being isolated from the first fluid chamber;
a master cylinder including a plurality of pistons that are slidably received in a cylindrical inner surface of the cylinder body and connected to the brake operation member, a first piston seal that seals between the cylindrical inner surface of the cylinder body and a cylindrical outer surface of one of the pistons thereby to define the first fluid chamber and a second piston seal that seals between the cylindrical inner surface of the cylinder body and a cylindrical outer surface of another of the pistons thereby to define the second fluid chamber;
a reservoir tank that is integral with the master cylinder;
a first inlet fluid passage that connects an inlet portion of the pump of the first brake piping system to the reservoir tank;
a second inlet fluid passage that connects an inlet portion of the pump of the second brake piping system to the reservoir tank; first and second pressure reducing fluid passages that connect the first and second inlet fluid passages to the wheel cylinders respectively; and
a normally closed pressure reducing valve provided to each of the pressure reducing fluid passages, the normally closed pressure reducing valve being opened to depressurize brake fluid in one of the wheel cylinders thereby to return the brake fluid to the reservoir tank through the corresponding inlet fluid passage,
wherein each of the inlet fluid passages is provided with a normally closed shutting valve that is connected to the at least one pressure reducing valve in series with respect to the wheel cylinders and the reservoir tank, a gate out valve provided to a first fluid passage that connects an outlet portion of each of the pumps to each of the outlet ports; and a second fluid passage that is branched from an interposition between the outlet portion of the pump of the first fluid passage and the gate out valve and connected to the wheel cylinders; and
wherein a pressure increasing valve is connected to the second inlet fluid passage.

9. A brake apparatus as claimed in claim 8, wherein the reservoir tank is provided with mutually isolated two chambers, one of the chambers is connected to the first inlet fluid passage and the other of the chambers is connected to the second inlet fluid passage.

10. A brake apparatus as claimed in claim 9, further comprising a controller programmed to control the pumps and the various valves, and to carry out a hydraulic pressure control by controlling the pumps and the valves even when one of the piping systems fails to operate.

11. A brake apparatus as claimed in claim 8, wherein the master cylinder is equipped with an auxiliary fluid chamber that is connected to the reservoir tank fluid-tightly isolated from the first fluid chamber, and the first inlet fluid passage connects the reservoir tank to the inlet portion of the pump of the first brake piping system through the auxiliary fluid chamber.

12. A brake apparatus as claimed in claim 11, further comprising a controller programmed to control the pumps and various valves, and to carry out a hydraulic pressure control by controlling the gate out valve in a valve closing direction, the pressure increasing valve in a valve opening direction and the at least one pressure reducing valve in a valve closing direction.

13. A brake apparatus as claimed in claim 12, wherein a third fluid passage is provided for connecting an interposition between the pressure increasing valve of the second fluid passage and a portion where the second inlet fluid passage is connected to the first inlet fluid passage , and the third fluid passage is provided with a hydraulic pressure control valve.

14. A brake apparatus as claimed in claim 13, wherein the hydraulic pressure control valve is a proportional control valve.

15. A brake apparatus as claimed in claim 14, further comprising a controller programmed to control the pumps and the various valves, and to control the proportional control valve and the shutting valve in a valve opening direction thereby to return the brake fluid from the wheel cylinders to the reservoir tank.

16. A brake apparatus comprising:
a master cylinder that includes a cylinder body that has an outlet port connected to wheel cylinders and has a first fluid chamber to produce a hydraulic pressure upon braking operation by the driver, a piston that is slidably received in a cylindrical inner surface of the cylinder body and connected to a brake operation member, and a first piston seal that seals between the cylindrical inner surface of the cylinder body and a cylindrical outer surface of the piston to define the first fluid chamber;
an inlet fluid passage that connects an inlet portion of a pump to a reservoir tank;
a pressure reducing fluid passage that connects the inlet fluid passage to the wheel cylinders; and
a normally closed pressure reducing valve connected to the pressure reducing fluid passage, wherein the at least one pressure reducing valve and a normally closed shutting valve are arranged between the reservoir tank and the wheel cylinders, and a gate out valve provided to a first fluid passage that connects an outlet portion of the pump to the outlet port; a second fluid passage that is branched from an interposition between the outlet portion of the pump of the first fluid passage and the gate out valve and connected to the wheel cylinders; and a pressure increasing valve connected to the second fluid passage.

17. A brake apparatus as claimed in claim 16, wherein the inlet fluid passage is constructed of a steel pipe.

\* \* \* \* \*